(12) United States Patent
Sato

(10) Patent No.: US 6,983,304 B2
(45) Date of Patent: Jan. 3, 2006

(54) SYSTEM AND APPARATUS FOR RECEIVING AN APPLICATION

(75) Inventor: Maki Sato, Tsutiura (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 10/126,362

(22) Filed: Apr. 19, 2002

(65) Prior Publication Data

US 2002/0188491 A1    Dec. 12, 2002

(30) Foreign Application Priority Data

Jun. 4, 2001    (JP) ............................. 2001-168337

(51) Int. Cl.
  *G06F 15/16*    (2006.01)
(52) U.S. Cl. ..................... 709/203; 709/202
(58) Field of Classification Search ................ 709/201, 709/202, 203
  See application file for complete search history.

(56) References Cited

U.S. PATENT DOCUMENTS 5,576,951 A * 11/1996 Lockwood .................. 705/27
5,598,477 A    1/1997 Berson
6,789,113 B1 * 9/2004 Tanaka ........................ 709/223
6,795,703 B2 * 9/2004 Takae et al. ................. 455/418

FOREIGN PATENT DOCUMENTS

| DE | 2961333 U | 12/1997 |
| DE | 20003864 U | 5/2000 |
| JP | 07-073242 A | 3/1995 |
| JP | 11-055251 | 2/1999 |

* cited by examiner

*Primary Examiner*—Zarni Maung
*Assistant Examiner*—Glenford Madamba
(74) *Attorney, Agent, or Firm*—Townsend and Townsend and Crew LLP

(57) ABSTRACT

A system for receiving an application includes a communication terminal for reading imaged information representing information on an input guidance prompting a user to do an input operation to receive an application and on a telephone number of an apparatus for receiving an application, analyzing the imaged information to produce input guidance information and outputs it to a user, receiving a selected input concerning the application presented by the user according to the input guidance information, connecting to the apparatus for receiving an application based on the telephone number, sending the selected input data of the application, receiving a response message for the application from the apparatus for receiving an application, and outputting the received response message to the user.

20 Claims, 6 Drawing Sheets

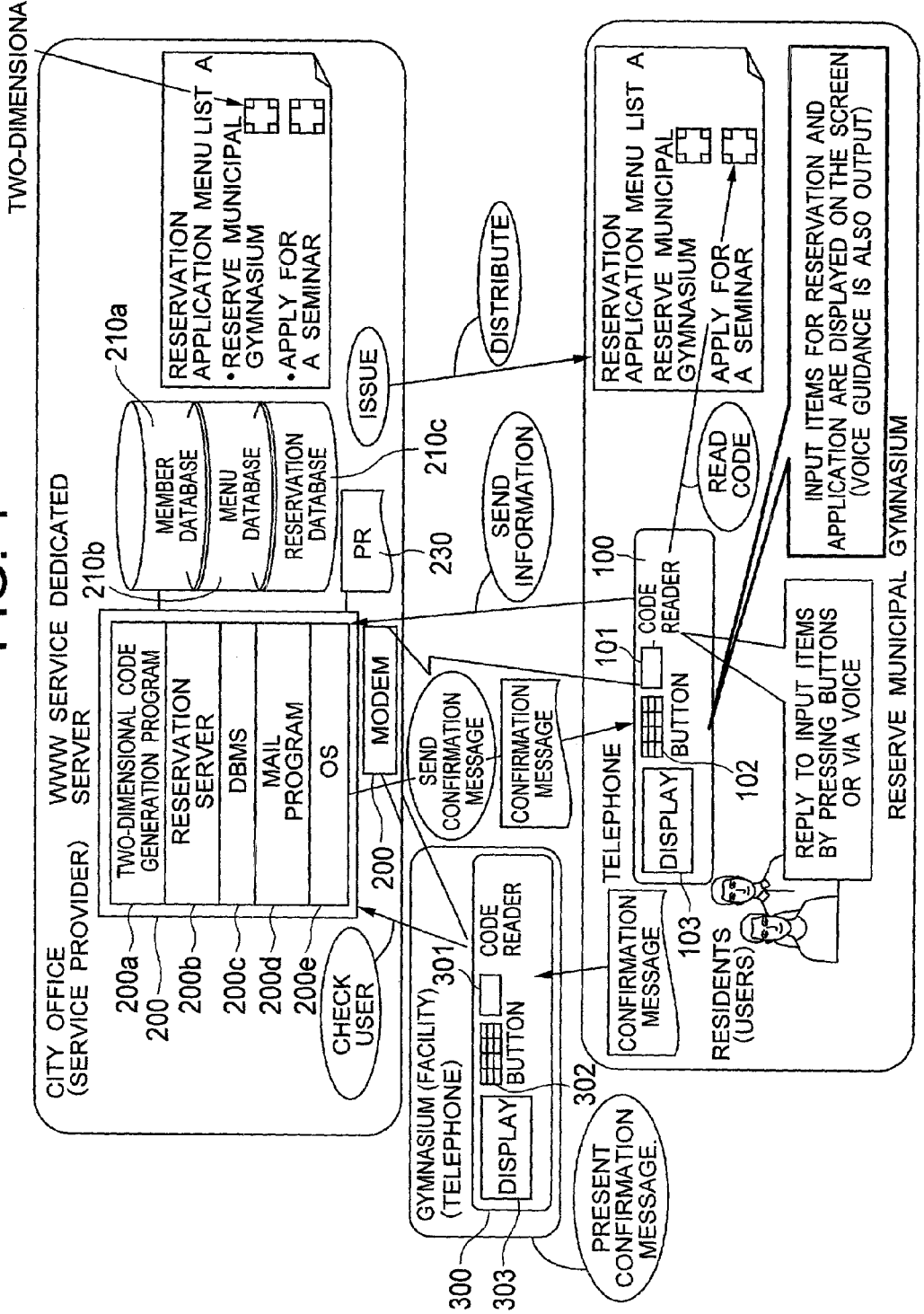

FIG. 2A

• DATA STRUCTURE OF RESERVATION APPLICATION MENU
TWO-DIMENSIONAL CODES (EXAMPLE: RESERVE FACILITY)

| DATA IDENTIFIER | TELEPHONE NUMBER | MENU NAME | INPUT ITEM | | |
|---|---|---|---|---|---|
| "FORM INFORMATION" | TELEPHONE NUMBER OF SERVICE PROVIDER | "RESERVE FACILITY" | "REQUESTED DATE" | "REQUESTED TIME" | "NUMBER OF PERSONS" | JOIN WAITING LIST? |

FIG. 2B

• DATA STRUCTURE OF RECEPTION COMPLETION
CONFIRMATION MESSAGE TWO-DIMENSIONAL CODES

| DATA IDENTIFIER | TELEPHONE NUMBER | KEY |
|---|---|---|
| "RECEPTION COMPLETION INFORMATION" | TELEPHONE NUMBER OF SERVICE PROVIDER | RECEPTION NUMBER |

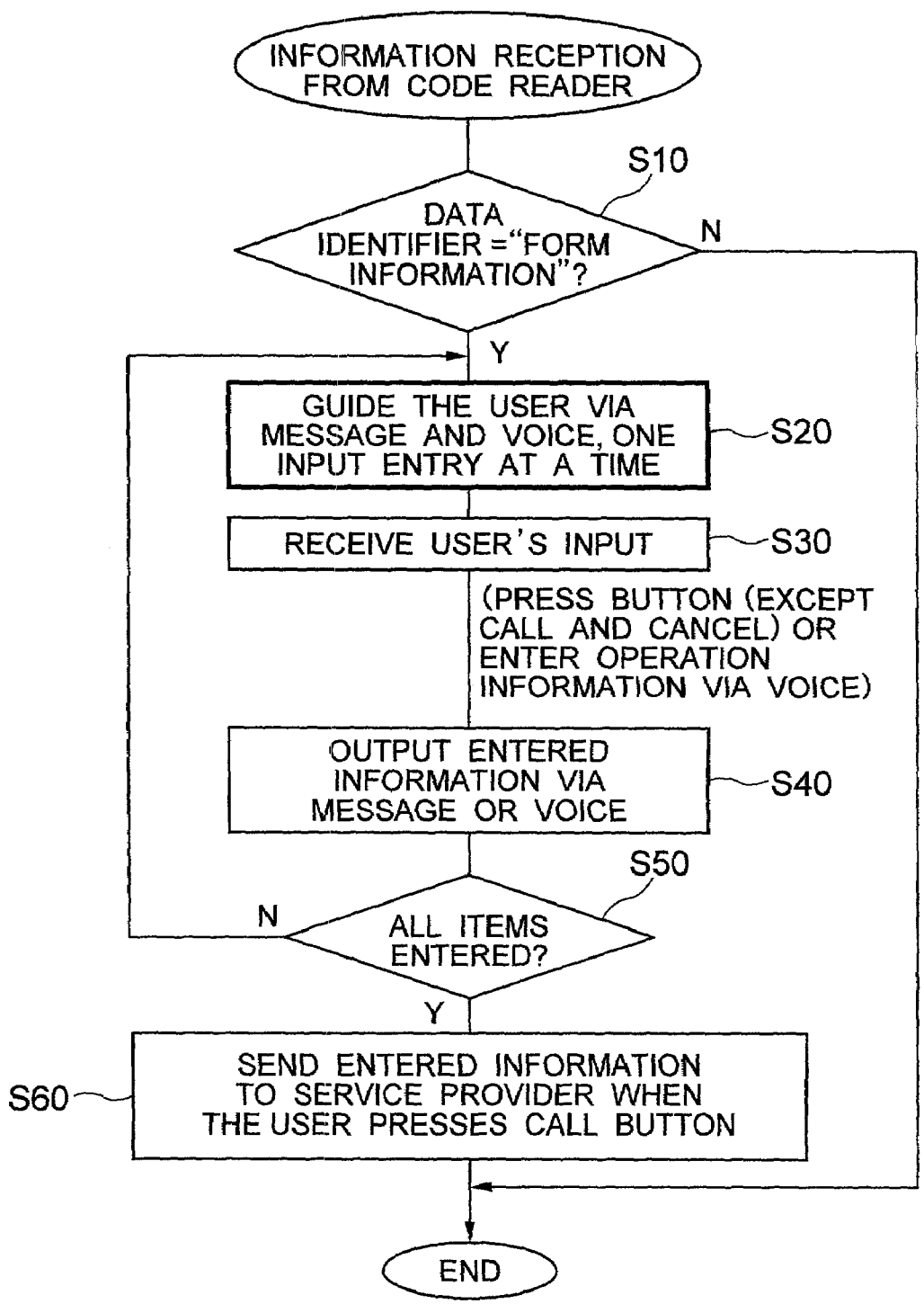

SYSTEM AND APPARATUS FOR RECEIVING AN APPLICATION

BACKGROUND OF THE INVENTION

The present invention relates to a system for receiving an application, and more particularly to an apparatus for receiving an application and a system for receiving an application with communication terminals each with the application function.

Service-over-the-counter provided by a self-governing body to the citizens has been digitized with more and more web pages created for the citizens over the Internet. Through those web pages, a citizen uses an information terminal such as a personal computer to make a reservation or execute an application procedure for public facilities such as a public hall. This convenient system enables a citizen to make a reservation or to execute an application procedure without having to go to the service window of the self-governing body or to the public facility.

However, although very convenient for those who are familiar with information technology, such information-terminal based procedures are inconvenient for those who have no personal computers at hand and, especially for those who are unfamiliar with information technology, it is even painful to sit at a personal computer. In addition, even if a personal computer is available, the Internet connection environment is not yet established in some cases and, even if the Internet connection environment is already established, it is troublesome to start the personal computer to access web pages.

This leads to the development of a technology that allows the user to automatically access a desired web page simply by feeding a bar code printed on a pamphlet or a technology that allows the user to use, not a personal computer but a telephone with the FAX function, to execute operation according to the voice guidance to get reservation information on public facilities.

However, even if a web page may be easily accessed, the user must start a personal computer in advance to connect to the Internet. When making a reservation or executing an application procedure, the user must enter personal information such as a user's name, address, and telephone number; when the user actually uses a public facility later, the user must enter an ID and a password for personal identification. Those entry operations are troublesome.

In addition, if the computer must stay in connection with the Internet over the telephone line during the entry operation, the Internet connection charge and the phone bill are required.

Even in the case where reservation information on public facilities is entered according to the voice guidance using, not a personal computer, but a pamphlet with a printed bar code, the phone bill is required during the operation.

SUMMARY OF THE INVENTION

In view of the foregoing, it is an object of the present invention to provide a technology that eliminates the need for entering personal information, an ID, and a password when making a reservation or executing an application procedure and that minimizes the phone bill for entering that information.

To achieve the above object, the technology of application reception according to the present invention is implemented by a system for receiving an application, the system comprising at least one communication terminal with an application function and an apparatus for receiving an application that receives a predetermined application from the communication terminal, wherein the communication terminal with an application function comprises communication unit for connecting to a desired communication destination over a public communication line network; imaged information reading unit for reading imaged information representing information on an input guidance prompting a user to do an input operation to receive the application and on a telephone number of the apparatus for receiving an application; imaged information analyzing unit for analyzing the imaged information to produce the input guidance information; input guidance outputting unit for outputting the input guidance information to the user according to the analyzed input guidance information; operation input receiving unit for receiving a selected input concerning the application presented by the user according to the input guidance information; application data sending unit for connecting to the apparatus for receiving an application via the communication unit based on the telephone number to send the selected input data of the application received by the operation input receiving unit; response message receiving unit for receiving, via the communication unit, a response message for the application from the apparatus for receiving an application which has received the data; and response message outputting unit for outputting the received response message to the user, and wherein the apparatus for receiving an application comprises user information storing unit for storing information such as a name of a user who wants to make the application and a telephone number thereof; communication unit for receiving a, message from the communication terminal with an application function; caller number obtaining unit for obtaining an incoming caller number sent from the communication terminal with an application function; caller number checking unit for checking if the obtained caller number is registered with the user information storing unit; application receiving unit for executing predetermined reception processing based on the data on the application sent from the communication terminal with an application function if the obtained caller number is registered with the user information storing unit; and response message generating and sending unit for generating a response message and sending the generated response message to the communication terminal with an application function over the public communication line network based on an execution result of the reception processing.

The communication terminal with an application function refers to a telephone and an information terminal with the communication function, including a home telephone, a cellular phone including a PHS, a PDA (Personal Digital Assistance) with the telephone function, and an information terminal such as a personal computer with the modem function.

The caller number is a calling number received by the apparatus for receiving an application, that is, the subscriber's telephone number of a communication terminal with the application function.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the general configuration of a system for receiving an application in one embodiment of the present invention.

FIG. 2A is a diagram showing the data structure of two-dimensional codes used in the system for receiving an application in one embodiment of the present invention and showing the data structure of list A containing an reservation application menu.

FIG. 2B is a diagram showing the data structure of two-dimensional codes used in the system for receiving an application in one embodiment of the present invention and showing the data structure of a confirmation message including a reception number.

FIG. 3 is a flowchart showing reservation application reception processing procedure executed by a telephone 100 in one embodiment of the present invention.

DETAILED DESCRIPTION OF THE EMBODIMENTS

One embodiment of the present invention will be described with reference to the FIGS. 1–6. As shown in the general configuration diagram in FIG. 1, when the user wants to reserve a public facility (a municipal gymnasium, etc.) or apply for a meeting (a seminar, etc.), he or she first uses a telephone 100 to connect to the service provider over the telephone line. In the service provider, for example, in a self-governing body's office such as a city office, a server dedicated to the WWW service (hereinafter simply called a "server") 200 is installed. This server 200 receives a reservation or an application request from the telephone 100.

Figure 5:
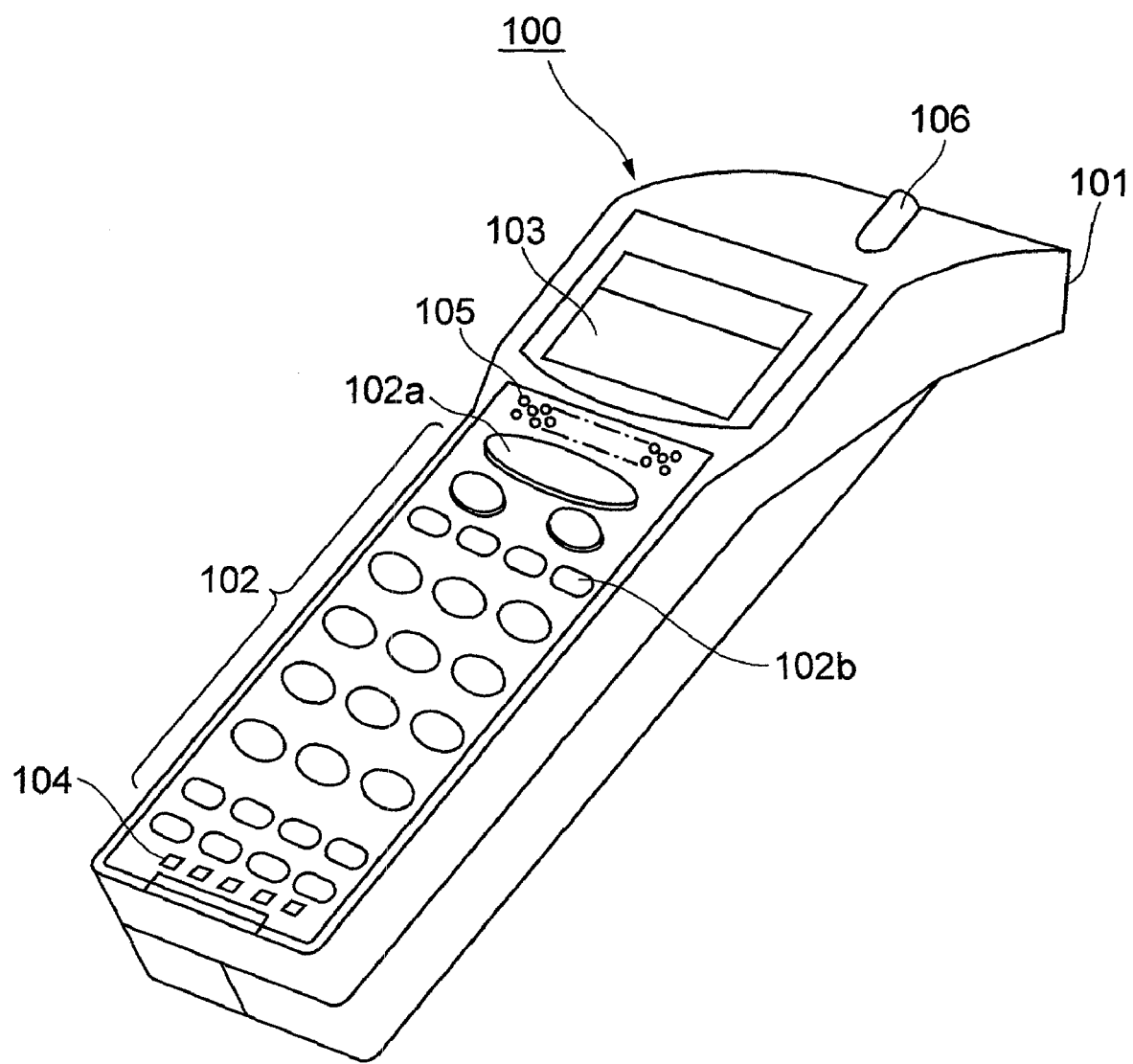
FIG. 5 is an external perspective view of the telephone 100 in one embodiment of the present invention.

An example of the configuration of the telephone 100 is shown, for example, in the external perspective view in FIG. 5. The telephone 100 comprises a code reader (laser scanner) 101 that is bar code information reading unit for reading bar code information, a key entry panel 102 that is operation unit for specifying various operations and for entering numeric values, a liquid crystal display 103 that is display unit for displaying various types of information, a microphone 104 that is voice information entry unit for receiving voice information, a speaker 105 that is voice information output unit for outputting voice information, and an antenna 106 that sends and receives radio waves in the PHS communication mode. As shown in the figure, the telephone 100 is configured as a code-reader-equipped mobile telephone that can be carried easily.

Figure 6:
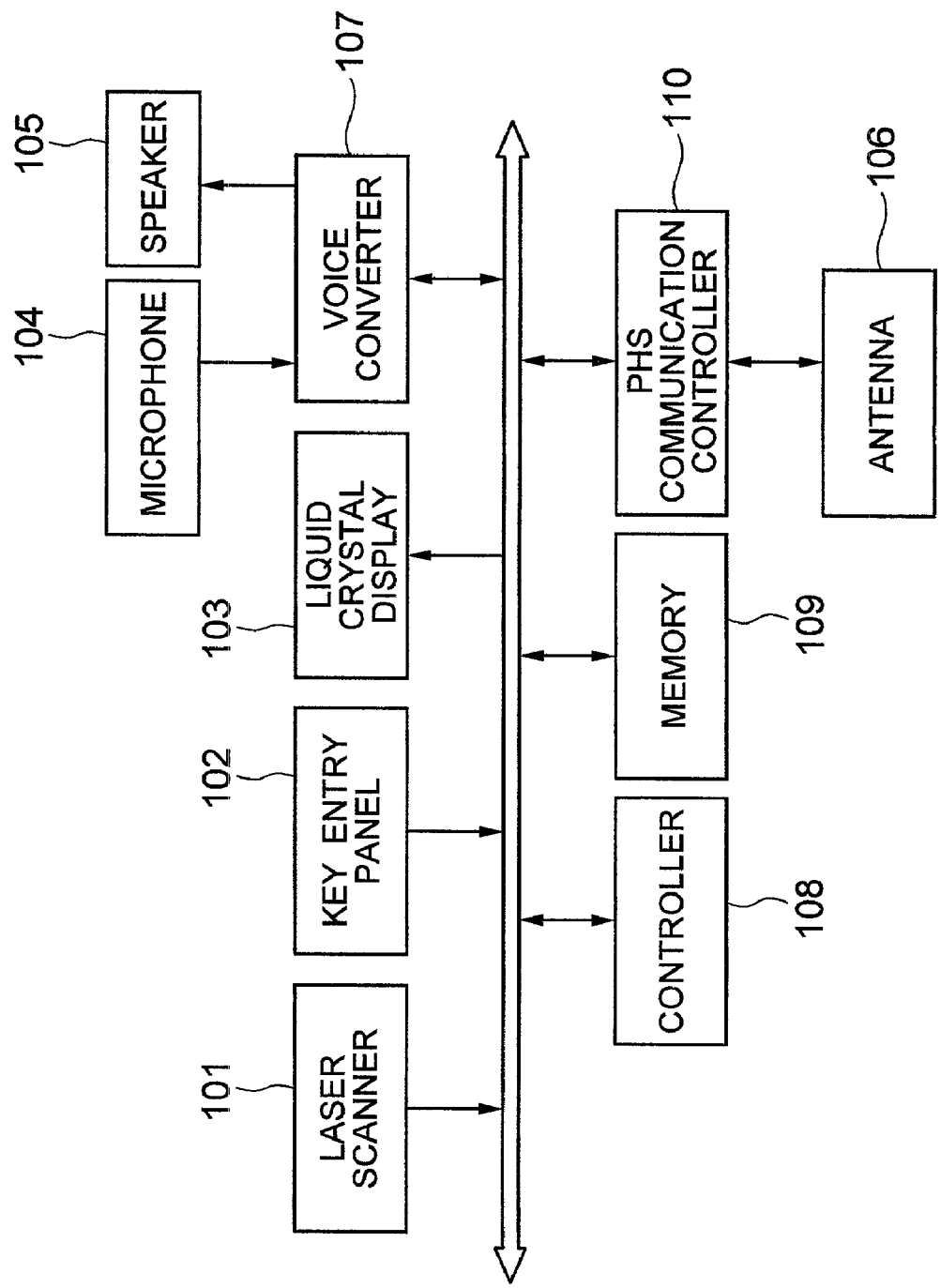
FIG. 6 is a block diagram showing the configuration of the telephone 100 in one embodiment of the present invention.

FIG. 6 is a block diagram showing the configuration of the telephone 100. In addition to the code reader (laser scanner) 101, key entry panel 102, liquid crystal display 103, microphone 104, speaker 105, and antenna 106, the telephone 100 further comprises a memory 109 that is storage unit for storing various types of numeric data and various types of applications, a PHS (Personal Handyphone System) communication controller 110 that is PHS communication unit for sending and receiving information via the antenna 106 in the PHS communication mode, a voice converter 107 that converts voice entered from the microphone 104 into digital signals and, at the same time, drives the speaker 105 based on the signals received via the antenna 106, and a controller 108 that is control means for controlling the execution of an application based on the operation specified via the key entry panel 102. The memory 109 stores an application that provides the PHS communication-mode telephone function, an application that analyzes two-dimensional codes for producing binary data, and an application that receives a reservation application request from the user based on the analyzed data.

Next, an example of the configuration of the server 200 and the databases used with the server 200 will be described. As shown in FIG. 1, the server 200 comprises a program 200a that generates two-dimensional codes, a facility reservation server 200b, a database management system (DBMS) 200c, a mail program 200d that sends and receives mail, and an operation system (OS) 200e. The server 200 provides various databases 210a–210c used for various purposes. The member master database 210a contains user information. The menu database 210b contains menu information on the facilities that users will request to reserve. The reservation database 210c contains information on the reservation application reception status. A modem 220 for communication with external units via a public line and a printer (PR) 230 are connected to the server 200.

In the telephone 100 and the server 200, a known technology disclosed in JP-A-11-55251 is used for converting from various types of data to two-dimensional codes and from two-dimensional codes to data.

A sequence of processing for receiving reservation applications will be described using a specific example. A self-governing body creates reservation application menu list A that contains items for making a reservation for public facilities or for applying for medical examinations and makes the list available for use by users. This list A contains known two-dimensional codes for each reservation application object. For those two-dimensional codes, the information codes with the data structure shown in FIG. 2(A) are used. That is, the information codes comprise a data identifier, called a form information, indicating whether or not the information codes are valid, a telephone number used to access the server 200, a reservation application object name called a menu name, and a sequence of prompt entry items including information on the requested date and time, the number of persons, and whether to join the waiting list.

A user who will obtain list A and execute the reservation application procedure must register required user information with the member master data-base 210a of the server 200 in advance. This user information, such as the telephone number, address, and name, will be required for the authentication at reservation application time.

The user, who has executed this registration procedure, is able to execute the reservation application procedure using the telephone 100 as shown in FIG. 1. That is, as shown in the flowchart of the telephone 100 in FIG. 3, the user reads the two-dimensional codes from the code reader (laser scanner) equipped with the telephone 100. The telephone 100 analyzes two-dimensional codes that have been read and stores the analyzed data into the memory 109. First, the telephone 100 checks if the data identifier of the analyzed data is valid form information (S10). If the information is not valid as the result of this checking (S10: NO), no processing is performed (END). Conversely, if the information is valid (S10: YES), the telephone 100 reads one of the above-described entry items of analyzed data from the memory 109 and outputs a voice guidance prompting the user to specify information, such as "requested date/time", from the speaker 105 via the voice converter 107. At the same time, the telephone 100 displays a corresponding message on the liquid crystal display 103 via the controller 108 (S20).

The telephone 100 receives a user's operation input entered in response to the voice guidance or the displayed message (S30). This user's operation input is entered by pressing buttons (keys) or via voice from the microphone. The input entered via keys or voice is stored in the memory 109 and, at the same time, output from the speaker 105 and on the liquid crystal display 103 to help the user confirm the operation (S40). Steps S20 to S40 are repeated for all input items. After that (S50: YES), when a predetermined operation input is received from the user (for example, "press call button"), a call is made to the server 200. Then, the telephone 100 sends all input item data stored in the memory 109 to the server 200 at a time (S60) and ends the reservation application processing (END).

Figure 4:
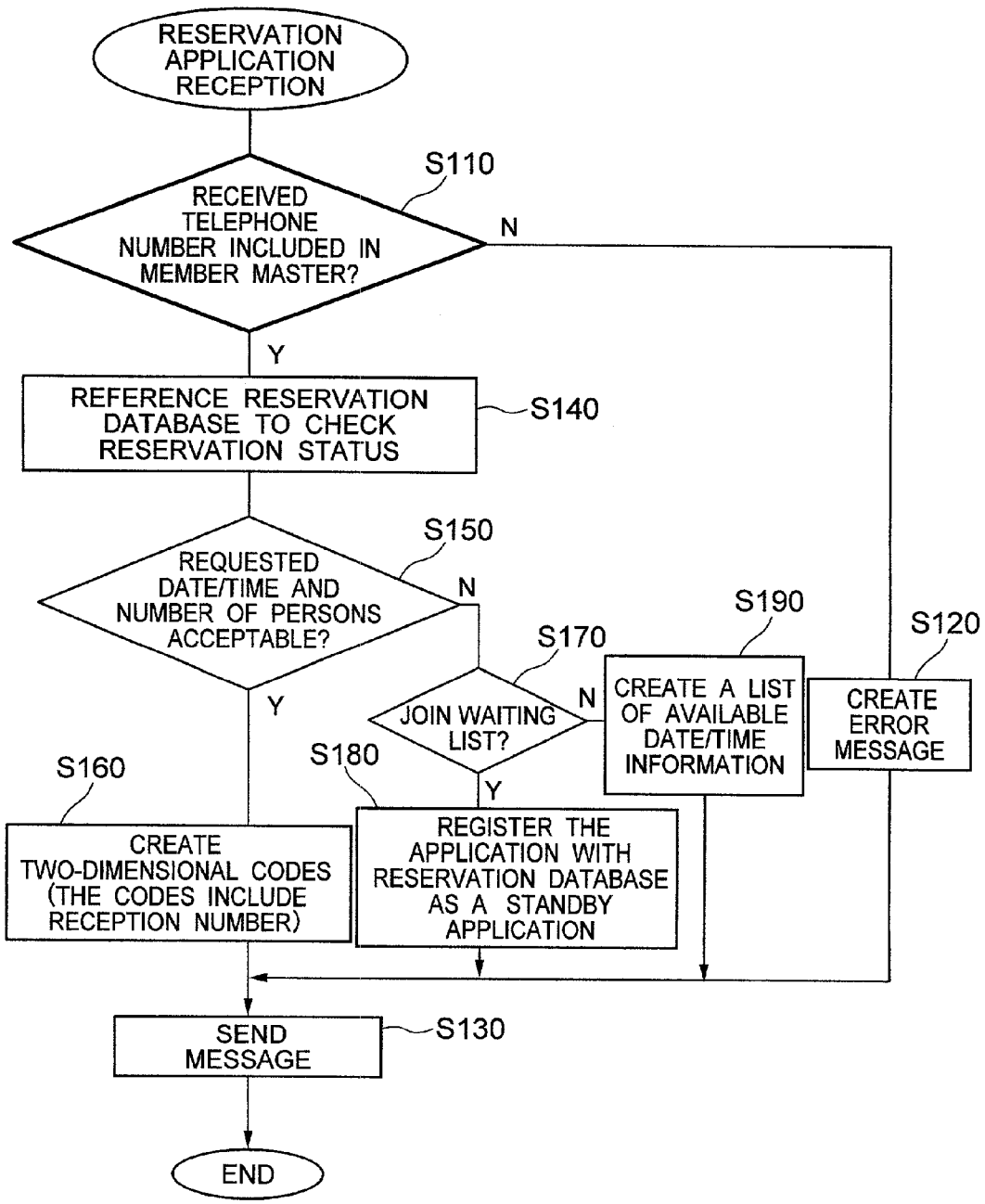
FIG. 4 is a flowchart showing reservation application reception processing procedure executed by a server 200 in one embodiment of the present invention.

Next, with reference to the general configuration diagram in FIG. 1 and the flowchart in FIG. 4, the following describes how the server 200 receives data on the input items from the telephone 100. First, the server 200 uses the caller number information service, provided by the operator of the public telephone line network, to obtain the received caller number (subscriber's number of the telephone 100) of the telephone 100 and authenticates the caller number. That is, if the received telephone number is not registered with the member master database 210a (S110: NO), the server 200 prepares an error message to be sent to the telephone 100 (S120), sends the message (S130), and ends the reception processing (END). Conversely, if the received telephone number is registered with the member master database 210a (S110: YES), the server 200 starts the reservation application reception processing and checks the reservation status using the reservation database 210c (S140) based on the received input item data. That is, the server 200 checks if the requested date/time, number of persons, and other items match the current reservation status (S150). If the user's reservation application contents match the reservation status (S150: YES), the server 200 receives the reservation application, registers the reservation with the reservation database 210c, generates two-dimensional codes including a reception number (execution permission information for reservation application) that will be used to authenticate the user when the user uses the facility (S160), sends the confirmation message including those codes (S130), and ends the reception processing (END). The two-dimensional codes in the reception completion confirmation message have the data structure such as that shown in FIG. 2(B), where the codes are composed of a data identifier indicating that the information is "reception completion information", a service provider's telephone number, and a reception number. On the other hand, if the user's reservation application contents do not match the reservation status (S150: NO), the server 200 checks if the user wants to join the waiting list based on the received data (S170). If the user wants to join the waiting list (S170: YES), the server 200 registers the user with the reservation database 210c as a standby user (S180), sends a message indicating the condition (S130), and ends the reception processing (END). If one of reservations is canceled later, the server 200 makes a call using the telephone number of the standby user to notify that the user's reservation application will be able to be registered. Conversely, if the user does not: want to join the waiting list (S170: NO), the server 200 creates a list of information including alternatives such as dates and times when the facility is available (S190), sends the list (S130), and ends the reception processing (END).

When the reception processing ends, communication with the telephone 100 ends.

In response to the confirmation message from the server 200, the telephone 100 outputs two-dimensional codes including the above-described reception number. That is, the telephone 100, if provided with the print function such as a FAX function or connectable to a printer, prints the two-dimensional codes as well as the received reservation application contents. And, when actually using the facility, the user feeds the printed two-dimensional codes into a code reader 301 of a telephone 300 provided in the facility as an application checking communication terminal, as shown in FIG. 1. This telephone 300 may have the configuration similar to that of the user's telephone 100 or may be an information terminal with the telephone function that can read the two-dimensional codes. If the telephone 100 is a cellular phone, the two-dimensional codes are not printed but displayed on the liquid crystal display 103 of the telephone 100; in this case, the user brings the liquid crystal display 103 near the code reader 301 of the telephone 300 to allow the code reader 301 to read the two-dimensional codes. The telephone 300 analyzes the two-dimensional codes that have been read, obtains the reception number, accesses the server 200, and sends the number and the request information to the server 200 to ask it to check if the user is a valid user. The server 200 searches the reservation database 210c for the received reception number and the request information to check if the user is a valid user, and sends the result to the telephone 300. If the user is a valid user, the user is allowed to use the facility. If the user is not a valid user, the server 200 sends an error message that is display on a display 303 of the telephone 300; in this case, the user is not allowed to use the facility.

If the user wants to cancel a received reservation application, the user uses the code reader 101 of the telephone 100 to read the two-dimensional codes included in the reception completion confirmation message and executes a predetermined input operation (For example, press the Send button). In response, the telephone 100 accesses the server 200 to send the reception number included in the two-dimensional codes. Upon receiving the reception number from the telephone 100 as well as the telephone number thereof, the server 200 regards that a cancel request has been received and cancels the corresponding reservation application contents registered with the reservation database 210c. If the user who uses the cellular-type telephone 100 wants to cancel a reservation application after receiving a mail-format reception completion confirmation message, the user sends back the message without changing the mail contents. In response to this sent-back message, the server 200 regards that the user has canceled the application.

The present invention is not limited to the reservation application of a facility as described in the above embodiment but may be applied broadly to an application procedure for various objects. In addition, the design of the system and the apparatus according to the present invention may be modified without departing from the sprit thereof. For example, instead of the two-dimensional codes described above, bar codes, microbar codes, an IC chip, and an IC tag may be used.

In addition, a card containing two-dimensional codes, an IC chip, or an IC tag containing user information may be issued when the user is registered. This enables the card reader on the user's telephone 100 to read the user information from the card to make the reservation application entry operation easier. Alternatively, user information may be stored in the memory 109 of the telephone 100 so that information, such as a telephone number and an address, may be sent to the server 200 when the user executes a predetermined input operation.

Furthermore, for use in canceling a reservation application, a two-dimensional code for cancellation may be recorded on the reservation application menu list A. The user uses the code reader 101 of the telephone 100 to read this two-dimensional code for transmission to the server 200.

Furthermore, when receiving reservation application specifications from the user via two-dimensional codes read by the telephone 100, all entry items may be displayed at a time instead of one at a time.

In addition, as a communication terminal with the application function, not only the telephone 100 described above but also a telephone and an information terminal with the communication function including a home telephone, a cellular phone including a PHS, a PDA (Personal Digital Assistance) with the telephone function, and an information terminal such as a personal computer with the modem function may be used.

The embodiment has the following effects. The system according to the present invention eliminates the need for the user to enter user information when making a reservation or executing an application procedure or to enter an ID and a password when using a facility. In addition, the communication terminal with the application function further comprises application data storing unit in which data selected by operation input receiving unit is stored. After the operation input receiving unit receives an application selection input, application data sending unit sends via communication unit a call to an application reception unit to connect thereto and reads data from the application data storing unit for transmission. By doing so, this method minimizes the phone bill that is required.

The system according to the present invention eliminates the need for the user to enter user information when making a reservation or executing an application procedure or to enter an ID and a password when using a facility.

It should be further understood by those skilled in the art that the foregoing description has been made on embodiments of the invention and that various changes and modifications may be made in the invention without departing from the spirit of the invention and the scope of the appended claims.

What is claimed is:

1. A system for receiving an application, said system comprising at least one communication terminal with an application function and an apparatus for receiving an application that receives a predetermined application from the communication terminal, wherein said communication terminal with an application function comprises:

communication unit for connecting to a desired communication destination over a public communication line network;

imaged information reading unit for reading imaged information representing information on an input guidance prompting a user to do an input operation to receive the application and on a telephone number of said apparatus for receiving an application;

imaged information analyzing unit for analyzing the imaged information to produce the input guidance information;

input guidance outputting unit for outputting the input guidance information to the user according to the analyzed input guidance information;

operation input receiving unit for receiving a selected input concerning the application presented by the user according to the input guidance information;

application data sending unit for connecting to said apparatus for receiving an application via said communication means based on the telephone number to send the selected input data of the application received by said operation input receiving unit;

response message receiving unit for receiving, via said communication unit, a response message for the application from said apparatus for receiving an application which has received the data; and response message outputting unit for outputting the received response message to the user, and wherein said apparatus for receiving an application comprises:

user information storing unit for storing information such as a name of a user who wants to make the application and a telephone number thereof;

communication unit for receiving a message from the communication terminal with an application function;

caller number obtaining unit for obtaining an incoming caller number sent from said communication terminal with an application function;

caller number checking unit for checking if the obtained caller number is registered with said user information storing unit;

application receiving unit for executing predetermined reception processing based on the data on the application sent from said communication terminal with an application function if the obtained caller number is registered with said user information storing unit; and response message generating and sending unit for generating a response message and sending the generated response message to said communication terminal with an application function over the public communication line network based on an execution result of the reception processing.

2. The system for receiving an application according to claim 1, wherein said communication terminal with an application function further comprises application data storing unit that stores the data selectively entered via said operation input receiving unit and wherein, after said operation input receiving unit receives the selected input of the application, said application data sending unit makes a call to said apparatus for receiving an application via said communication unit to connect thereto and reads the data from the application data storing unit for transmission to said apparatus for receiving an application.

3. The system for receiving an application according to claim 1, wherein said apparatus for receiving an application further comprises imaged information generating unit for generating imaged information and including the imaged information into the response message, said imaged information indicating that the user is allowed to execute contents of the received application when the user actually executes the application, and wherein said response message outputting unit of said communication terminal with an application function has a function for printing, or a function for displaying, contents of the response message including the imaged information, said system for receiving an application further comprising an application checking communication terminal installed in a facility where the application is to be executed and providing a communication function, wherein said application checking communication terminal comprises imaged information reading and analyzing unit for reading and analyzing imaged information included in the printed or displayed response message; and execution permission information obtaining unit for obtaining execution permission information based on the analyzed imaged information.

4. The system for receiving an application according to claim 3, wherein said application checking communication terminal connects to said apparatus for receiving an application via an appropriate communication line for transmission of the execution permission information thereto and requests said apparatus for receiving an application to check if the execution permission information is valid.

5. An apparatus for receiving an application that receives a predetermined application from a communication terminal with an application function connected over a public communication line network, said apparatus for receiving an application comprising:

user information storing unit for storing information such as a name of a user who wants to make the application and a telephone number thereof;

receiving unit for receiving a message from the communication terminal with an application function;

caller number obtaining unit for obtaining an incoming caller number sent from said communication terminal with an application function;

caller number checking unit for checking if the obtained caller number is registered with said user information storing unit;

application receiving unit for executing predetermined reception processing based on data on the application sent from said communication terminal with an application function if the obtained caller number is registered with said user information storing unit; and response message generating and sending unit for generating a response message and sending the generated response message to the communication terminal with an application function over the public communication line network based on an execution result of the reception processing.

6. The apparatus for receiving an application according to claim 5, further comprising imaged information generating unit for generating imaged information and including the imaged information into the response message, said imaged information indicating that the user is allowed to execute contents of the received application when the user actually executes the application.

7. The apparatus for receiving an application according to claim 6, wherein the imaged information of the response message is either two-dimensional codes or bar code patterns.

8. A communication terminal with an application function connected to a predetermined apparatus for receiving an application over a public communication line network and executing application processing, said communication terminal comprising:

communication unit for connecting to a desired communication destination over the public communication line network;

imaged information reading unit for reading imaged information on an input guidance prompting a user to do an input operation to receive the application and on a telephone number of said apparatus for receiving an application;

imaged information analyzing unit for analyzing the imaged information to produce the input guidance information;

input guidance outputting unit for outputting the input guidance information to the user according to the analyzed input guidance information;

operation input receiving unit for receiving a selected input concerning the application presented by the user according to the input guidance information;

application data sending unit for connecting to said apparatus for receiving an application via said communication unit based on the telephone number for transmission of the selected input data of the application received by said operation input receiving unit;

response message receiving unit for receiving, via said communication unit, a response message for the application from said apparatus for receiving an application which has received the data; and response message outputting unit for outputting the received response message to the user.

9. The communication terminal with an application function according to claim 8, further comprising application data storing unit for storing the data selectively entered via said operation input receiving unit and wherein, after said operation input receiving unit receives the selected input of the application, said application data sending unit makes a call to said apparatus for receiving an application via said communication unit to connect thereto and reads the data from the application data storing unit for transmission to said apparatus for receiving an application.

10. The communication terminal with an application function according to claim 8, wherein the imaged information is either two-dimensional codes or bar code patterns.

11. The communication terminal with an application function according to claim 8, wherein said input guidance outputting unit has either a function for displaying the input guidance contents on an attached display or outputting the input guidance contents via voice from an attached speaker.

12. The communication terminal with an application function according to claim 8, wherein said response message outputting unit has a function for printing the response message contents or a function for displaying the response message contents on the display.

13. An apparatus for receiving an application that receives a predetermined application from a communication terminal with an application function connected over a communication path, said apparatus for receiving an application comprising:

user information storing unit for storing information such as a user who wants to make the application and a telephone number thereof;

receiving unit for receiving a message from the communication terminal with an application function;

caller number obtaining unit for obtaining an incoming caller number sent from said communication terminal with an application function;

caller number checking unit for checking if the obtained caller number is registered with said user information storing unit;

application receiving unit for executing predetermined reception processing based on data on the application sent from said communication terminal with an application function if the obtained caller number is registered with said user information storing unit; and response message generating and sending unit for generating a response message and sending the generated response message to the communication terminal with an application function over the communication path based on an execution result of the reception processing.

14. The apparatus for receiving an application according to claim 13, further comprising imaged information generating unit for generating imaged information and including the imaged information into the response message, said imaged information indicating that the user is allowed to execute contents of the received application when the user actually executes the application.

15. The apparatus for receiving an application according to claim 14, wherein the imaged information of the response message is either two-dimensional codes or bar code patterns.

16. A communication terminal with an application function connected to a predetermined apparatus for receiving an application over a communication path and executing application processing, said communication terminal comprising:

communication unit for connecting to a desired communication destination over the communication path;

imaged information reading unit for reading imaged information on an input guidance prompting a user to do an input operation to receive the application and on a telephone number of said apparatus for receiving an application;

imaged information analyzing unit for analyzing the imaged information to produce the input guidance information;

input guidance outputting unit for outputting the input guidance information to the user according to the analyzed input guidance information;

operation input receiving unit for receiving a selected input concerning the application presented by the user according to the input guidance information;

application data sending unit for connecting to said apparatus for receiving an application via said communication unit based on the telephone number for transmission of the selected input data of the application received by said operation input receiving unit;

response message receiving unit for receiving, via said communication unit, a response message for the application from said apparatus for receiving an application which has received the data; and response message outputting unit for outputting the received response message to the user.

17. The communication terminal with an application function according to claim 16, further comprising application data storing unit for storing the data selectively entered via said operation input receiving unit and wherein, after said operation input receiving unit receives the selected input of the application, said application data sending unit makes a call to said apparatus for receiving an application via said communication unit to connect thereto and reads the data from the application data storing unit for transmission to said apparatus for receiving an application.

18. The communication terminal with an application function according to claim 16, wherein the imaged information is either two-dimensional codes or bar code patterns.

19. The communication terminal with an application function according to claim 16, wherein said input guidance outputting unit has either a function for displaying the input guidance contents on an attached display or outputting the input guidance contents via voice from an attached speaker.

20. The communication terminal with an application function according to claim 16, wherein said response message outputting unit has a function for printing the response message contents or a function for displaying the response message contents on the display.

* * * * *